United States Patent [19]

Imada et al.

[11] Patent Number: 4,581,219

[45] Date of Patent: Apr. 8, 1986

[54] METHOD OF MAKING MACROPOROUS MANGANESE DIOXIDE

[75] Inventors: Nobuyuki Imada; Toshiteru Okada, both of Takehara, Japan

[73] Assignee: Mitsui Mining & Smelting Co., Ltd., Nihombashi-Muromachi, Japan

[21] Appl. No.: 666,688

[22] Filed: Oct. 31, 1984

Related U.S. Application Data

[62] Division of Ser. No. 615,781, May 31, 1984, Pat. No. 4,551,254.

[30] Foreign Application Priority Data

Jun. 22, 1983 [JP] Japan ............................ 58-111090

[51] Int. Cl.$^4$ .................................... C01G 45/02
[52] U.S. Cl. ...................... 423/605; 210/500.1; 210/502.1; 252/186.33; 423/50; 502/324; 502/400
[58] Field of Search .............. 423/50, 605; 502/324, 502/400; 252/186.33; 210/681, 687, 688, 691, 807, 500.1, 502.1

[56] References Cited

U.S. PATENT DOCUMENTS

| 2,122,735 | 7/1938 | Bellone | 423/605 |
| 2,145,901 | 2/1939 | Shoemaker | 210/688 |
| 2,355,808 | 8/1944 | Lawlor | 210/502.1 |
| 3,222,277 | 12/1965 | Joyce | 210/688 |
| 3,356,452 | 12/1967 | Moore | 423/605 |
| 3,856,576 | 12/1974 | Prieto | 423/605 |
| 4,256,609 | 3/1981 | Dale | 502/324 |
| 4,277,360 | 7/1981 | Mellors | 423/605 |
| 4,402,931 | 9/1983 | Tanabe | 423/605 |

FOREIGN PATENT DOCUMENTS

| 56-32332 | 4/1981 | Japan | 423/605 |
| 56-45829 | 4/1981 | Japan | 423/605 |

*Primary Examiner*—Ernest G. Therkorn
*Attorney, Agent, or Firm*—Bucknam and Archer

[57] ABSTRACT

A water purifier consisting essentially of manganese dioxide particles having a 20 to 48 mesh size and macroscopic pores which are so large in size as to permit passage of water therethrough. The particles may have active sites of needle-like or columnar crystals of manganese dioxide on the surfaces thereof. A method for making such water purifier is also described.

4 Claims, 10 Drawing Figures

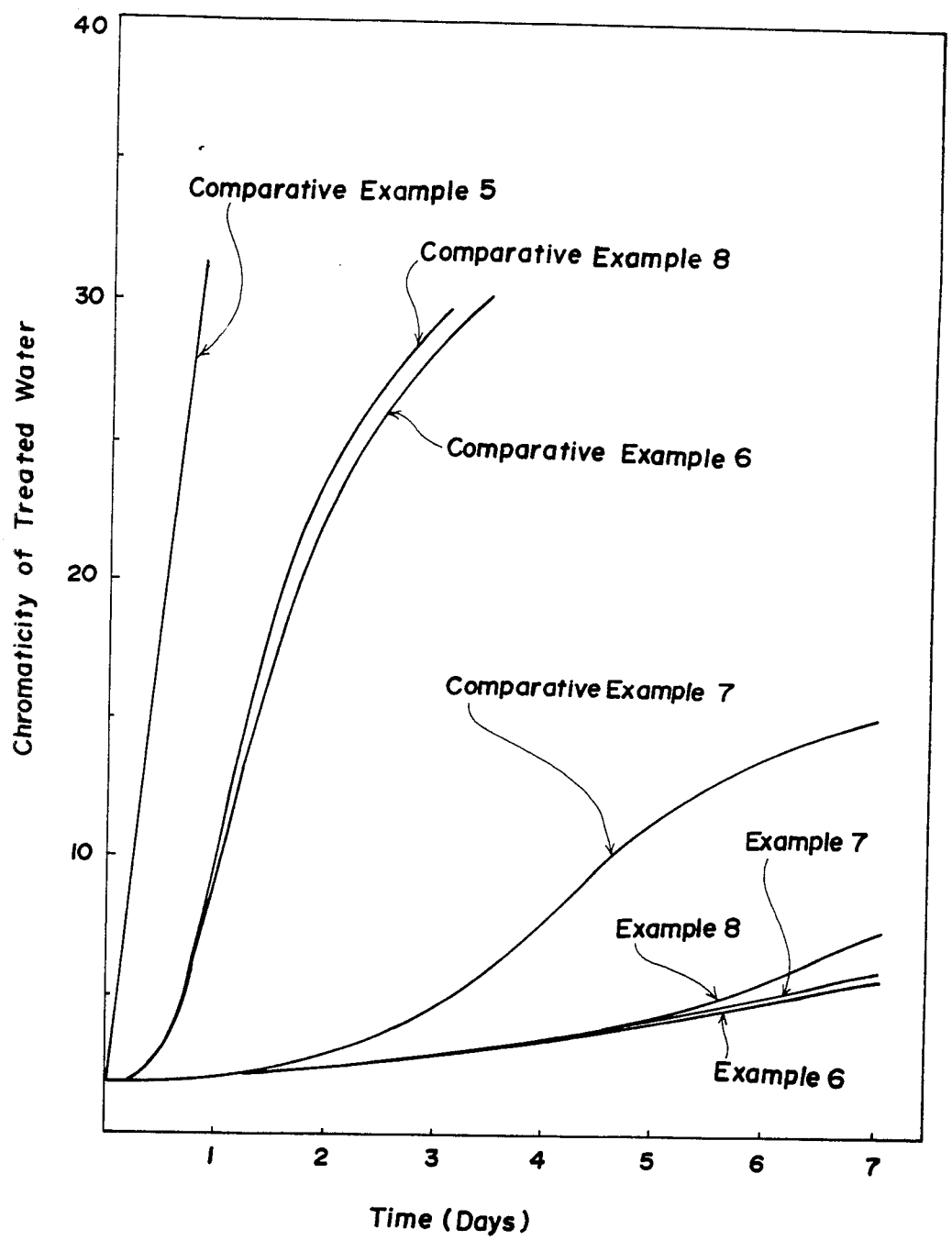

FIG. 5(a)
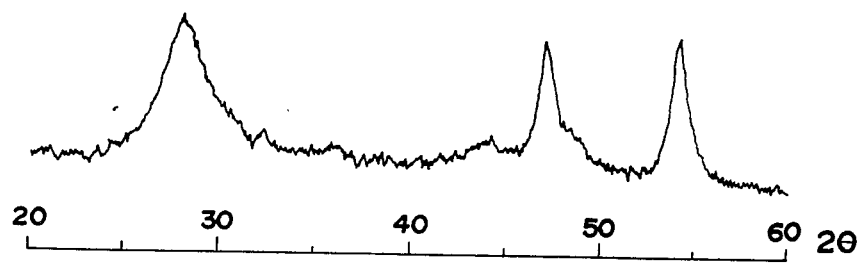
FIG. 5(b), (c)
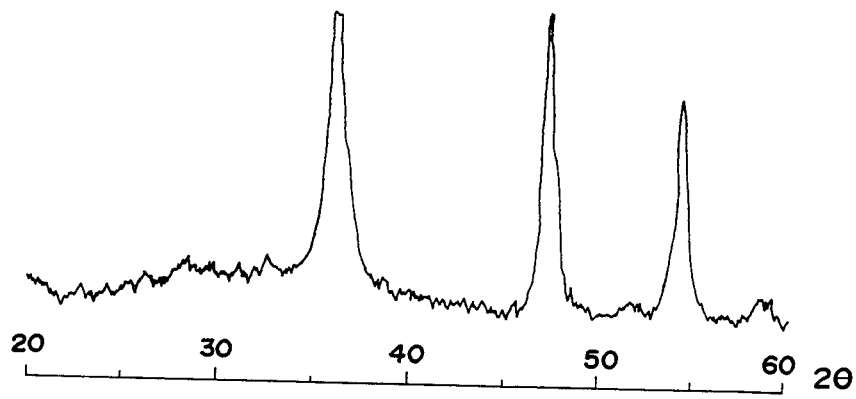
FIG. 5(d)
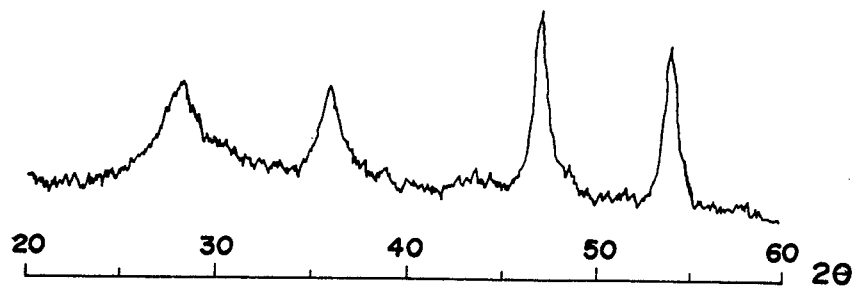

METHOD OF MAKING MACROPOROUS MANGANESE DIOXIDE

This is a Divisional of application Ser. No. 615,781, filed May 31, 1984, now U.S. Pat. No. 4,551,254.

BACKGROUND OF THE INVENTION

1. Field of the Invention

This invention relates to water treatments and more particularly to water purifiers which are useful in purifying raw water from lakes or rivers in order to remove manganese and iron components and colored matters therefrom. It also relates to a method for making such water purifiers.

2. Description of the Prior Art

Recent trends toward pollution of lakes and rivers are beyond the bounds of imagination, leading to an increase in amount of raw water which is rather unsuitable for use as city water. This in turn requires complicate treating apparatus with an attendant rise of treating cost.

Several methods of removing manganese and iron components and coloring matters such as humus from raw water are known including an oxidation method using ozone or oxidizing agents, an adsorption method using active carbon, a contact filtration method using manganese-deposited zeolites, a coagulating sedimentation method using coagulants, and combinations of these methods.

The oxidation method using ozone or an oxidizing agent such as potassium permanganate is disadvantageous because of the high treating cost. Especially, use of ozone requires an additional equipment of preventing air pollution. The adsorption method using active carbon is not effective because active carbon has little adsorptivity of manganese and iron components and is low in removability of coloring matters.

The contact filtration method makes use of manganese zeolite which has manganese dioxide deposited on the surface thereof. This type of zeolite is prepared by immersing zeolite in a solution containing divalent manganese ions and adding an oxidizing agent such as, for example, potassium permanganate to have manganese dioxide deposited on the surface of zeolite. In this method, however, a large amount of an expensive chemical such as potassium permanganate is used, leading to a high treating cost. If raw water being treated has a high content of manganese, it cannot be removed efficiently. Because manganese dioxide is deposited on the surface of zeolite, the dioxide may readily fall off and be lost with the deposited zeolite deteriorating in quality.

It is generally accepted that manganese dioxide itself has the effect of removing manganese, iron and coloring matters from water. For use as a water purifier, manganese dioxide has to be reduced into pieces having a suitable range of size. For instance, chips of electrolytic manganese dioxide removed from the electrode or natural manganese dioxide may be crushed to have a desired particle size. Alternatively, manganese dioxide powder may be bonded with use of an inorganic binder such as alumina cement and shaped to have a suitable particle size. However, the former manganese dioxide particles are disadvantageous in that a reactive area is relatively small. On the other hand, the particles obtained by using inorganic binder have the drawback that active surfaces of the manganese dioxide are covered with the inorganic binder added and the purification effect is lower than the one achieved by the starting manganese dioxide material itself.

SUMMARY OF THE INVENTION

It is accordingly an object of the present invention to provide water purifiers useful for purifying water which overcome the drawbacks of the prior art.

It is another object of the invention to provide water purifiers which are useful in efficiently, economically removing manganese and iron components and coloring matters from raw water such as from lakes, rivers and the like.

It is a further object of the invention to provide a method for making the water purifiers of the above-mentioned type.

The above objects can be achieved, according to the invention, by a water purifier for use in the purification of water which consists essentially of discrete particles of manganese dioxide having a 20 to 48 mesh size, the particles having macroscopic pores through which water is able to pass. Preferably, the particles should have active sites on the surfaces thereof in the form of needle-like or columnar crystals.

The particles of manganese dioxide having such large-size pores are obtained by a method which comprises immersing starting manganese dioxide powder in an acidic solution comprising from 5 to 80 g/liter of divalent manganese ions and from 5 to 100 g/l of an acid for a term of from 2 to 7 days at a temperature of from 80° to 100° C., reducing the resulting manganese dioxide mass into pieces, classifying the pieces to have a size of from 20 to 48 mesh, and neutralizing the pieces with an alkali whereby manganese dioxide particles having macroscopic pores through which water is able to pass are obtained. Preferably, magnesium ions may be further added to the acidic solution. By the immersion in the acidic solution containing manganese and/or magnesium ions, the starting manganese dioxide powder which may be microscopically porous is bonded without any binder and converted into a macroscopically porous mass. In a preferred embodiment of the invention, manganese dioxide of the gamma type is used and immersed in such acidic solution as defined above under such conditions that part or all of the manganese dioxide is converted into beta-type manganese dioxide while forming a macroscopically porous mass with surface activity. The present invention also provides a method for making a water purifier of the type described above.

BRIEF DESCRIPTION OF THE DRAWINGS

FIG. 4 is a graph showing the relation between chromaticity of water treated in Examples 6 and 7 using another type of manganese dioxide water purifier according to the invention and time by days after the treatment; and FIGS. 5(a) through 5(f) are, respectively, X-ray diffraction patterns of ordinary gamma-manganese dioxide, beta-manganese dioxide obtained in Examples 1, 4, 6, and 8, and a mixture of beta- and gamma-manganese dioxide substances obtained in Examples 5 and 7.

DETAILED DESCRIPTION AND PREFERRED EMBODIMENTS OF THE INVENTION

Figure 1A:
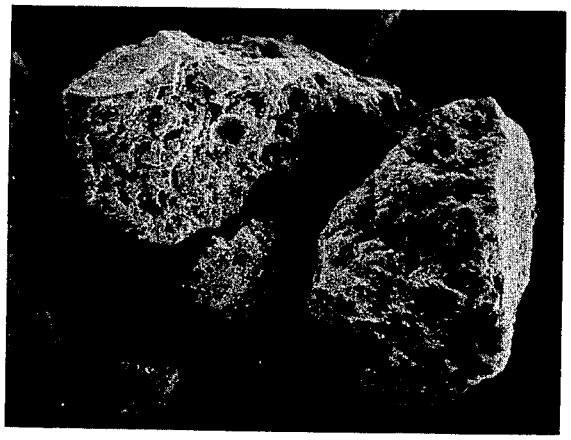
FIGS. 1(a) and 1(b) are, respectively, microphotographs by electron microscope showing the surface state of a manganese dioxide water purifier according to the invention.

As described before, the manganese dioxide particles of the present invention should be macroscopically porous and have a mesh size of 20 to 48. The term 'macroscopically porous particles' used herein is intended to mean particles having pores which permit free passage of water through the pores. Ordinary particles of manganese dioxide are microscopically very porous but have not such macroscopic pores.

Macroscopically particles of manganese dioxide according to the invention are readily obtained by immersing manganese dioxide powder in an acidic solution containing divalent manganese ions preferably along with magnesium ions for a time sufficient to convert the powder into a macroscopically porous mass of the dioxide. The acidic solution is prepared to have a concentration of an acid of from 5 to 100 g per liter of the solution. A typical example of the acid is sulfuric acid though other mineral acids such as (nitric acid, hydrochloric acid, phosphoric acid and the like) may be used. In the acidic solution, it is essential that divalent manganese ions be present in an amount of from 5 to 80 g per liter of the solution. Preferably, divalent magnesium ions should be further added in an amount up to 50 g per liter of the solution. If magnesium ions are used singly instead of the divalent manganese ions, the conversion velocity unfavorably becomes very low. The reason why magnesium ions are used is that an apparent specific gravity of the resulting particles becomes smaller than in the case where magnesium ions are used singly upon comparing at the same level of particle size, thus leading to an increase of porosity. The divalent manganese and magnesium ions may be derived from various sources. Such sources include inorganic salts such as (nitrates, sulfates, phosphates and the like of these metals).

In order to ensure high mechanical strength of the macroscopically porous mass, the temperature of the acidic solution should preferably be as high as possible but below a boiling point of the solution. Moreover, the immersion time is preferred to be as long as possible.

The macroscopically porous mass is subsequently reduced into pieces having a 20 to 48 mesh size (U.S. mesh) for use as a water purifier. The reduction into pieces may be carried out by any known means and the pieces may be classified to have a defined range of size as usual.

Next, the pieces are washed with water until the washing has a hydrogen ion concentration within the regulated standard for city water, followed by neutralizing with an alkaline substance such as caustic soda. The manganese dioxide particles obtained by the above sequence of treating steps have the high ability of removing manganese and iron components from water and also coloring matters therefrom. By the neutralization, the pH of water purified by passage through the water purifier of the invention is in the range of about 5.8 to 8.6 at the initial stage of the water passage, which is within the standard for city water.

In the above embodiment, starting manganese dioxide powder may have any crystal forms such as alpha, beta, gamma and delta forms.

In accordance with another embodiment of the invention, the macroscopically porous manganese dioxide particles are of the beta form or the beta and gamma-mixed form in crystal structure. In order to obtain these types of manganese dioxide, the starting manganese dioxide powder should be of the gamma form and is subjected to the same procedure as described with regard to the first embodiment. As a result, macroscopically porous manganese dioxide particles of the beta form or the beta and gamma-mixed form are obtained.

In general, manganese dioxide of the beta form may be prepared by several methods including, for example, heating of gamma-manganese dioxide at about 400° C., treatment of gamma-manganese dioxide in an autoclave containing an aqueous solution of an oxidative salt, and electrolysis of manganese dioxide under elevated current density conditions. However, water purifiers of beta-manganese dioxide obtained by these methods are much poorer in water purification performance and bleaching ability than the manganese dioxide of the beta form or the beta and gamma-mixed form of the invention. From this, it will be appreciated that manganese dioxide useful as a water purifier should have not only the beta form or beta and gamma-mixed form in crystal structure, but also possess macroscopic pores through which water is able to pass freely and the form of needle-like or columnar crystals on the surfaces thereof.

As described before, gamma-manganese dioxide powder is converted into the macroscopically porous manganese dioxide mass of the beta or beta and gamma-mixed form under conditions defined with reference to the first embodiment. Higher concentrations of manganese and magnesium ions and an acid result in a higher velocity of conversion of from the gamma form to the beta form. It is favorable that the conversion velocity is relatively low from the standpoint of mechanical strength of the mass.

A mixing ratio of the beta to gamma form may be arbitrarily varied by changing the immersion conditions. In order to ensure good water purification performance, the mixing ratio should preferably be in the range of $$\frac{\text{beta form}}{\text{beta form} + \text{gamma form}} = 1 \text{ to } 0.8.$$

The starting gamma-manganese dioxide is not necessarily pure gamma-manganese dioxide but may contain, aside from gamma-manganese dioxide, several to some dozen percent of manganese dioxide of other crystal forms. Electrolytic manganese dioxide is made of the gamma form alone or the gamma form with several percent of beta form. Thus, this dioxide is suitable as a starting material of this embodiment.

Although electrolytic manganese dioxide of the gamma form is very microscopically porous, manganese dioxide particles of the invention having macroscopic pores through which water is able to pass are very advantageous for use as a water purifier.

When the water purifiers of the invention are practically applied, it is convenient to add, to raw water being treated, oxidizing agents such as sodium hypochlorite in order to further improve the removability of coloring matters, whereby the service life of the water purifiers would be prolonged several years.

The present invention is more particularly described by way of examples, comparative examples and experimental examples.

EXAMPLE 1

A sulfuric acid solution bath containing 20 g/l a divalent manganese ions and 100 g/l of sulfuric acid was heated to 90° C. To the solution was added manganese dioxide powder, followed by allowing to stand for 3 days while keeping the temperature of the solution at 90° C., thereby obtaining a firm manganese dioxide mass.

The mass was crushed and classified to obtain particles having a 20 to 48 mesh size. The particles were washed with water to remove the acid attached thereto and immersed in a caustic soda solution for neutralization.

Figure 1B:
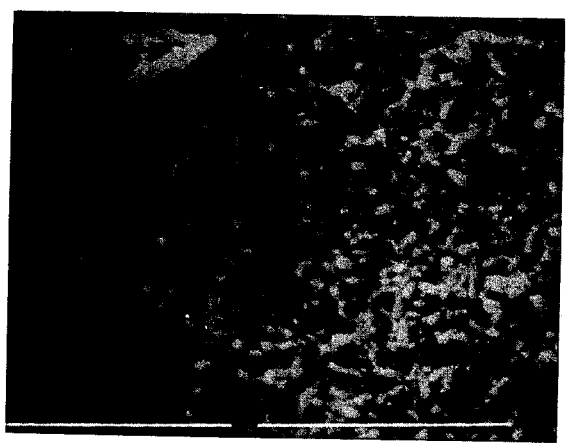

The microphotograph, by an electron microscope, of the water purifier for water purification is shown in FIG. 1. As will be clear from the figure, the water purifier of the invention has macroscopic pores and the columnar crystals on the surface thereof.

EXAMPLE 2 AND COMPARATIVE EXAMPLES 1-3

The water purifier obtained in Example 1, an ordinarily used water purifier obtained by shaping electrolytic manganese dioxide with Portland cement (Comparative Example 1), a water purifier made of particles obtained by crushing a block of electrolytic manganese dioxide (Comparative Example 2), and a water purifier made of manganese-deposited zeolite (Comparative Example 3) were subjected to a comparison test for removal of coloring matters.

Figure 2:
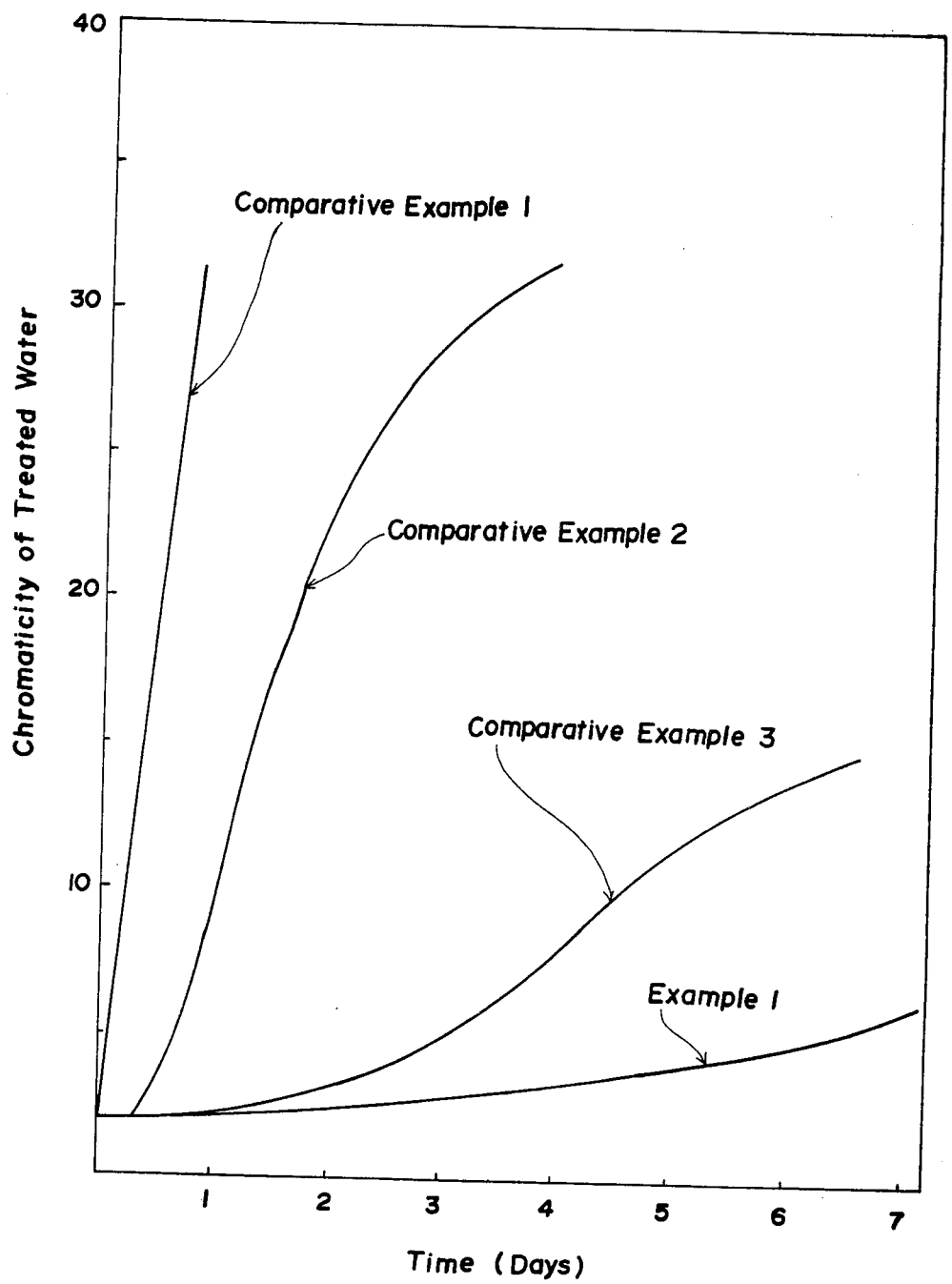
FIG. 2 is a graph showing the relation between chromaticity of water treated in Example 2 and Comparative Examples 1 through 3 and time after the treatment.

The test was carried out as follows. 100 cc of each water purifier was charged into a column. Subsequently, raw water was added humic acid in an amount sufficient to give a chromaticity of 40 was passed through the column at a rate of 1000 cc/hour. The results are shown in FIG. 2. It will be noted that the above test is generally accepted as a general evaluation method for removing manganese, iron and coloring matters from water.

The results of FIG. 2 reveal that the water purifier of Example 1 has the highest ability to purify water and this ability decreases in the following order: the manganese-deposited zeolite water purifier of Comparative Example 3 > the water purifier of the electrolytic manganese dioxide particles of Comparative Example 2 > the water purifier of Comparative Example 1. While the water purifier of Comparative Example 3 which has the best purifying ability among the water purifier for comparison has about 3 days with respect to a time before the chromaticity, which is the standard level of water, exceeds 5, the water purifier of Example 1 has such a time of about 6 days. From this, it will be seen that the water purifier of the invention is much better in purifying ability than the known water purifiers. The pH of water after treatment was found to be approximately at the same level as of the raw water being treated.

EXAMPLE 3 AND COMPARATIVE EXAMPLE 4

The water purifier used in Example 2 and the water purifier of Comparative Example 3 (i.e. manganese-deposited zeolite) were subjected to the manganese-removing test for comparison. Raw water was prepared to have 5 ppm of divalent manganese ions and 5 ppm of divalent iron ions. Subsequently, the test procedure of Example 2 were repeated.

With the manganese-deposited zeolite water purifier (Comparative Example 4), the total amount of water being treated before the amount of remaining manganese reached a standard level of 0.3 ppm was about 20 liters. On the other hand, the water purifier of the invention was as large as about 300 liters with regard to the total amount. Thus, it will be clear that the water purifier of the invention is better in removability of manganese than the known water purifier. With regard to iron, no iron was detected before the content of remaining manganese reached 0.3 ppm.

EXAMPLE 4

A sulfuric solution containing 20 g/l of divalent manganese ions, 10 g/l of magnesium ions and 100 g of sulfuric acid was used to make a water purifier in the same manner as in Example 1. This water purifier and the water purifier obtained in Example 1 were subjected to a comparison test in the same manner as in Example 2. The results are shown in FIG. 3.

Figure 3:
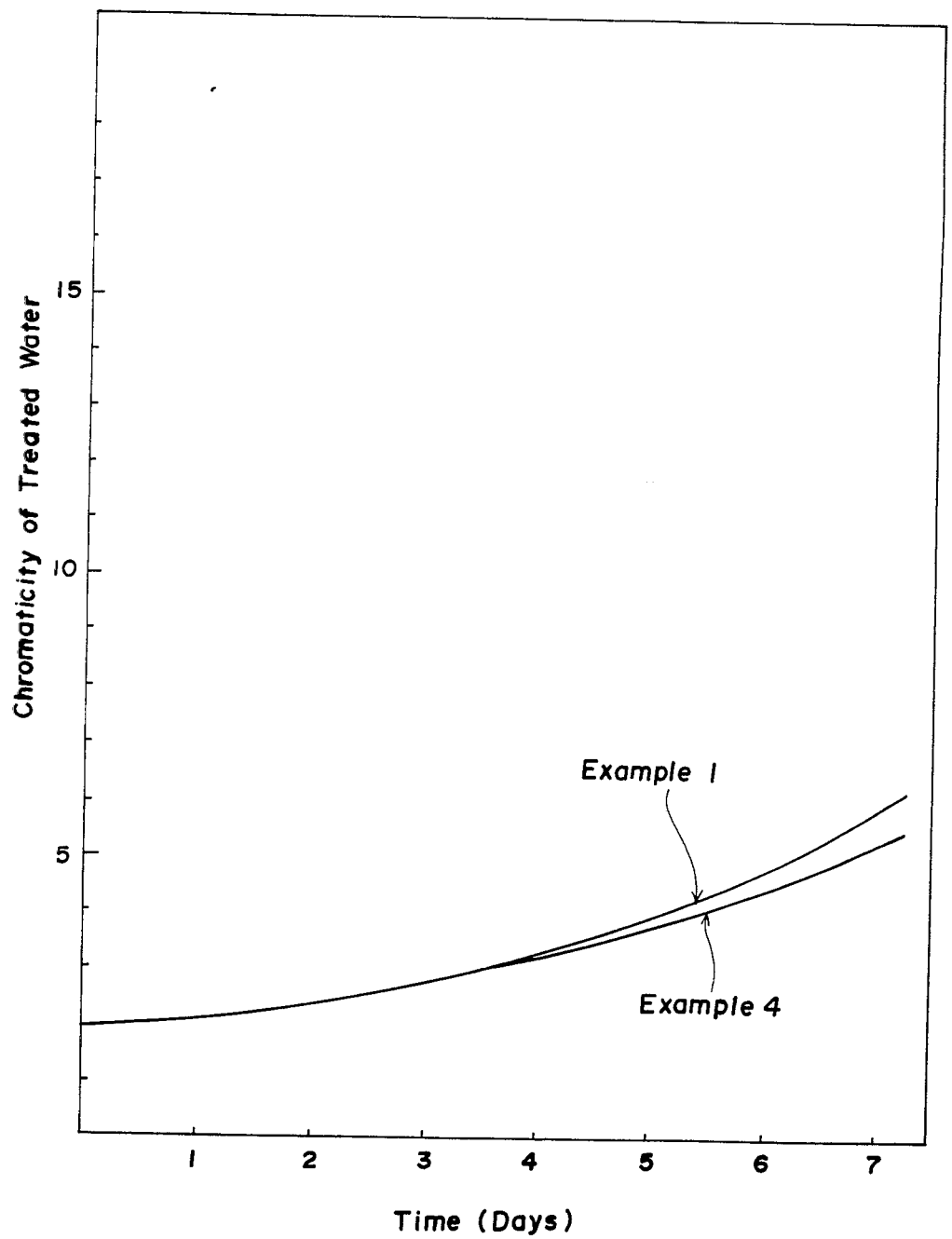
FIG. 3 is a graph showing the relation between chromaticity of water treated in Examples 2 and 3 using one type of manganese dioxide water purifier according to the invention and time by days after the treatment.
Figure 5E:
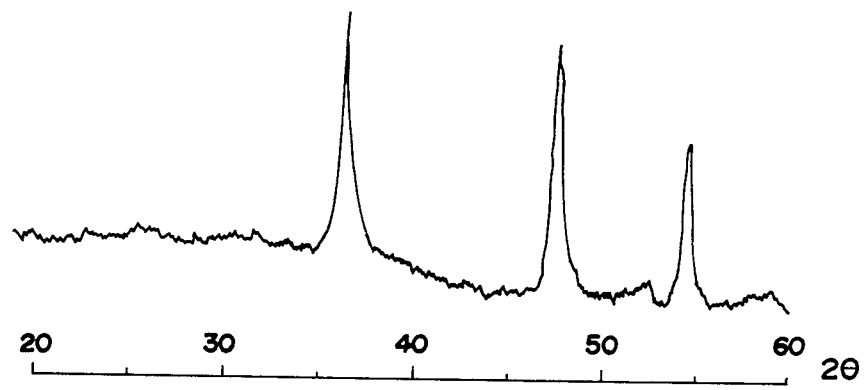
Figure 5F:
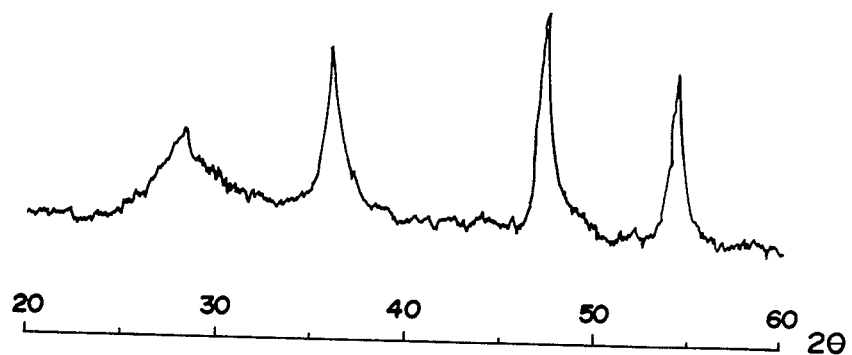

As will be seen from FIG. 3, the water purifier of Example 4 is better in purifying performance than the water purifier of Example 1. More particularly, the time before the chromaticity exceeded 5 was found to be 6.1 days for the water purifier of Example 1, whereas the time was 6.6 days for the water purifier of Example 4. From this, it will be appreciated that the addition of magnesium ions to the sulfuric acid solution containing divalent manganese ions contributes to improve the water purifying ability.

EXAMPLE 5

A sulfuric acid solution containing 10 g/l of magnesium ions and 100 g/l of sulfuric acid was used to make a water purifier in the same manner as in Example 1. The resulting water purifier and the water purifier obtained in Example 1 were tested in the same manner as in Example 2 to evaluate the removability of coloring matters.

As a result, it was found that the water purifiers of Examples 1 and 5 were similar to each other with regard to the purifying ability.

EXAMPLE 6

A sulfuric acid solution containing 20 g/l of divalent manganese ions, 10 g/l of magnesium ions and 50 g/l of sulfuric acid was used to make a water purifier in the same manner as in Example 1.

The resulting water purifier and the water purifier obtained in Example 1 were tested in the same manner as in Example 2 to evaluate the removability of coloring matters.

As a result, it was found that the water purifiers of Examples 1 and 6 were similar to each other with regard to the purifying ability.

EXAMPLE 7

A sulfuric acid solution containing 20 g/l of divalent manganese ions, 10 g/l of magnesium ions and 30 g/l of sulfuric acid was used to make a water purifier in the same manner as in Example 1.

The resulting water purifier and the water purifier obtained in Example 1 were tested in the same manner as in Example 2 to evaluate the removabiltiy of coloring matters.

As a result, it was found that the water purifiers of Examples 1 and 7 were similar to each other with regard to the purifying ability.

COMPARATIVE EXAMPLES 5-8

A water purifier obtained by shaping gamma-manganese dioxide powder with Portland cement (Comparative Example 5), a water purifier obtained by crushing electrolytic gamma manganese dioxide block and classifying the resulting pieces in a predetermined range of size (Comparative Example 6), a manganese-deposited zeolite water purifier (Comparative Example 7), and a water purifier of beta-manganese dioxide obtained by heating the water purifier of Comparative Example 6 at 400° C. (Comparative Example 8) were prepared by known techniques.

EXPERIMENTAL EXAMPLE 1

The water purifiers obtained in Examples 6,7 and 8 the water purifiers obtained in Comparative Examples 5 through 8 were each subjected to the test of removing coloring matters.

100 cc of each water purifier was charged into a column and raw water whose chromaticity was adjusted to 40 by the use of humic acid was passed through the column at a rate of 1000 cc/hr. The results are shown in FIG. 4. As will be clearly seen from the figure, the water purifiers of the present invention have much higher removability than the water purifiers of the comparative examples. Among the prior art water purifiers, the removability decreases in the following order: the manganese-deposited zeolite water purifier of Comparative Example 7 > the water purifier of Comparative Example 6 obtained by crushing electrolytic manganese dioxide and classifying the resulting pieces > the water purifier of Comparative Example 8 obtained by heating the water purifier of Comparative Example 6 at 400° C. > the water purifier of Comparative Example 5 using electrolytic gamma-manganese dioxide particles shaped with Portland cement. The time before the chromaticity exceeded 5 was about 3 days in the case of the water purifier of Comparative Example 7 which has the best purifying performance among the water purifiers for comparison. This time was about 6 days for both water purifiers of the present invention. This demonstrates that the water purifiers of the invention are far much more excellent in purifying performance than the conventional water purifiers having little or no macroscopic pores therein. The pH of water after treatment with the water purifiers of Examples 6, 7 and 8 was found to be almost the same as the pH of the raw water.

EXPERIMENTAL EXAMPLE 2

The water purifier of Example 6 and the manganese-deposited zeolite water purifier of Comparative Example 7 were subjected to a manganese-removal test. Raw water being treated was prepared to have 5 ppm of divalent manganese ions and 5 ppm of divalent iron ions. The raw water was treated in the same manner as in Experimental Example 1.

With the manganese-deposited zeolite water purifier (Comparative Example 4), the total amount of water being treated before the amount of remaining manganese reached a standard level of 0.3 ppm was about 20 liters. On the other hand, the water purifier of the invention was as large as about 300 liters with regard to the total amount. Thus, it will be clear that the water purifier of the invention is better in removability of manganese than the known water purifier. With regard to iron, no iron was detected before the content of remaining manganese reached 0.3 ppm.

From the comparison between Examples 4, 6 and 7 wherein the acidic solutions having different sulfuric acid concentrations were respectively used, it is apparent that the water purifiers increase in strength as the sulfuric acid concentration decreases.

With respect to the effect of magnesium in the acidic solution, Example 4 wherein the magnesium-containing acidic solution was used exhibited higher strength than Example 1 wherein magnesium-free acidic solution was used.

Further, Example 8 wherein the immersion in the acidic solution was maintained for a longer time exhibited high strength than Example 7 wherein the immersion in the acidic solution was maintained for a shorter time.

EXPERIMENTAL EXAMPLE 3

X-ray diffraction patterns, using iron balbs, of starting gamma-manganese dioxide obtained by electrolysis of manganese sulfate, and the manganese dioxide products obtained in Examples 1, 4, 5, 6 and 7 are, respectively, shown in FIG. 5(a) through 5(f).

In FIGS. 5(i a), 5(d) and 5(f), there are seen broad diffraction peaks at $2\theta = 28°$ which are characteristic to gamma-manganese dioxide.

On the other hand, in FIGS. 5(b) through 5(f), there appear sharp diffraction peaks at $2\theta = 26°$ which are characteristic to beta-manganese dioxide.

From the diffraction patterns, it will be appreciated that the starting manganese dioxide is gamma-manganese dioxide, the manganese dioxide mass obtained in Examples 1, 4 and 6 are beta-manganese dioxide, and the manganese dioxide mass of Examples 5 and 7 are manganese dioxide of gamma and beta-mixed forms.

EXAMPLE 8

A sulfuric acid solution bath containing 20 g/l of divalent manganese ions, 10 g/l of magnesium ions and 30 g/l of sulfuric acid was heated to 90° C.

To the solution was added manganese dioxide powder, followed by allowing to stand for 7 days while keeping the temperature of the solution at 90° C., thereby obtaining a firm manganese dioxide mass.

The mass was crushed and classified to obtain particles having a 20 to 48 mesh size.

The particles were washed with water to remove the acid attached thereto and immersed in a caustic soda solution for neutralization.

EXPERIMENTAL EXAMPLE 4

The water purifiers of Example 1, 4, 5, 6, 7 and 8 and the conventional water purifiers of Comparative Examples 1 and 3 were subjected to a strength test.

The test was conducted in accordance with an abrasion test which is one of filter sand test methods (JWWA A 103) for city water. More particularly, 50 g of each water purifier was weighed and charged into an iron tube, to which were added five steel balls having a diameter of 9 mm. The tube was tightly sealed and violently shaked at a rate of 250 times per minute for 5 minutes.

After completion of the shaking, the content was sifted with a screen having a 80 mesh to determine a weight, W, of the water purifier on the screen. The abrasion rate was calculated from the following equation Abrasion rate (%) = (50 − W) × 2

The results are shown in Table below.

TABLE

| Water Purifier | Abrasion Rate (%) |
| --- | --- |
| Example 1 | 7.0 |
| Example 4 | 5.4 |
| Example 5 | 9.5 |
| Example 6 | 4.1 |
| Example 7 | 2.5 |
| Example 8 | 2.0 |
| Comparative Example 1 | 4.2 |
| Comparative Example 3 | 2.0 |

WHAT IS CLAIMED IS:

1. A method for making a water purifier of manganese dioxide particles having macroscopic pores adapted to use in the purification of water, the method comprising immersing starting manganese dioxide powder in an acidic solution comprising from 5 to 80 g/liter of divalent manganese ions and from 5 to 100 g/l of an acid for a term of over 2 days at a temperature of from 80° to 100° C., reducing the resulting manganese dioxide mass into pieces, classifying the pieces to have a size of from 20 to 48 mesh, and neutralizing the pieces with an alkali whereby manganese dioxide particles having macroscopic pores through which water is able to pass and needle-like or columnar crystals on the surfaces thereof are obtained.

2. The method according to claim 1, wherein said starting manganese dioxide powder is of the gamma form, including up to 30% of manganese dioxide powder of any other form.

3. The method according to claim 1, wherein said acid is sulfuric acid.

4. The method according to claim 1, wherein said acidic solution further comprises up to 50 g/l of magnesium ions.

* * * * *